United States Patent [19]

Khanna

[11] 4,151,132

[45] Apr. 24, 1979

[54] MOLDING COMPOSITION

[75] Inventor: Sarwan K. Khanna, Indianapolis, Ind.

[73] Assignee: RCA Corporation, New York, N.Y.

[21] Appl. No.: 818,716

[22] Filed: Jul. 25, 1977

[51] Int. Cl.$^2$ .................. C08L 91/00; G11B 11/12
[52] U.S. Cl. .................. 260/23 XA; 260/23 EP;
    260/23 H; 260/998.16; 358/128; 358/129
[58] Field of Search .................. 252/511, 62, 54;
    260/23, 998.16, 23 H, 23 EP, 23 XA; 358/128,
    129

[56]            References Cited
          U.S. PATENT DOCUMENTS

| | | | |
|---|---|---|---|
| 2,636,869 | 4/1953 | de Tartas | 260/998.16 |
| 3,135,379 | 6/1964 | Naudain | 260/28.5 |
| 3,481,893 | 12/1969 | Pungs et al. | 260/998.16 |
| 3,833,541 | 9/1974 | Shen | 260/998.16 |
| 3,842,194 | 10/1974 | Clemens | 178/6.6 A |
| 3,842,217 | 10/1974 | Clemens | 179/100.4 C |
| 3,859,389 | 1/1975 | Carty et al. | 260/885 |
| 3,909,517 | 9/1975 | Clemens | 178/6.6 A |
| 3,919,137 | 11/1975 | Dyer et al. | 260/17 A |
| 3,960,790 | 6/1976 | Khanna | 260/23 XA |
| 3,975,321 | 8/1976 | Heiberger | 260/998.16 |

*Primary Examiner*—Ronald W. Griffin
*Attorney, Agent, or Firm*—H. Christoffersen; Birgit E. Morris

[57]              ABSTRACT

An improved molding composition for compression molding non-coated video discs containing about 12–20 percent of conductive carbon black particles, about 10 percent of a vinyl chloride-vinyl acetate copolymer, about 10 percent of a vinyl chloride-maleate ester copolymer, about 15–17 percent of polymeric plasticizers and processing aids, about 3.5 percent of two or more metal stabilizers, about 1.5 percent of three or more lubricants and the remainder a copolymer of vinyl chloride containing about 6–8 percent of propylene.

10 Claims, No Drawings ly to produce a more processable composition. The choice of specific plasticizers is determined in part by their compatibility with the other ingredients.

MOLDING COMPOSITION

This invention relates to a novel molding composition. More particularly, this invention relates to a molding composition for non-coated video discs.

BACKGROUND OF THE INVENTION

A capacitance video recording and playback system has been disclosed in U.S. Pat. Nos. 3,842,194, 3,842,217 and 3,909,517 to Clemens, incorporated herein by reference. According to this system, vinyl disc replicas can be prepared having geometric variations in a spiral groove in the disc surface which correspond to capacitance variations representative of video signals. The discs are coated first with a thin conductive metal layer and then with a dielectric layer. A metal stylus completes the capacitor and, during playback, rides upon the dielectric coating and detects dimensional variations in the groove. These variations are reconstituted in electrical signal form and converted back to video information suitable for display by a television receiver.

Since the relief pattern and the groove are of very small dimensions, e.g., there are 5000-10,000 grooves per inch (12,700-25,400 grooves per centimeter), much research and expense have been required to learn how to put down metal and dielectric layers which conform to the relief pattern, are thin enough so that they do not fill the grooves and yet are thick enough so as to form a coherent, continuous layer.

It will be apparent that if the metal and dielectric layers could be eliminated, with no substantial loss of signal or increase in noise level on playback of the disc, it would be a great advance as far as cost savings in manufacturing are concerned.

Fox et al in copending U.S. application entitled "Non-Coated Video Disc Replicas", filed July 27, 1977, Ser. No. 818,279, have disclosed non-coated, conductive video disc replicas made by molding a plastic material containing sufficient finely divided conductive particles so that the material has a bulk resistivity below about 500 ohm-centimeters at 900 megahertz, the playback frequency. Excellent video disc replicas can be compression molded using vinyl chloride homopolymers and copolymers containing a stabilizer, a lubricant and, optionally, a processing aid containing about 12-20 percent by weight of a conductive carbon black having a low bulk density.

However, when it was desired to scale up the process to commercial quantities, difficulties were encountered with the existing molding composition. When mixing large quantities of molding compound, high temperatures are generated due to the high shear and length of time required for good dispersion of the ingredients, particularly large amounts of conductive particles. Excessive temperatures lead to decomposition and high volatiles generation, as well as staining and excessive bleed out of the additives. Further, the melt viscosity of the molding composition was too high for compression molding on a large scale. In addition, the video disc replicas were rather brittle and tended to warp on storage under high temperature, high humidity conditions.

SUMMARY OF THE INVENTION

A molding composition suitable for molding video discs comprises from about 12 to about 20 percent by weight of finely divided conductive carbon black particles; about 10 percent by weight of a vinyl chloride copolymer containing about 15 percent by weight of vinyl acetate; about 10 percent by weight of a vinyl chloride-maleate ester copolymer containing about 25 percent by weight of the ester, about 15-17 percent by weight of a mixture of four or more plasticizers and processing aids; about 3.5 percent by weight of a mixture of two or more metal stabilizers together containing more than one metal ion; about 1.5 percent by weight of a mixture of at least three lubricants and the remainder a copolymer of vinyl chloride containing about 6-8 percent by weight of propylene. This molding composition has a bulk resistivity of less than 500 ohm-centimeters at 900 megahertz and has a melt viscosity and processability suitable for compression molding non-coated video discs.

DETAILED DESCRIPTION OF THE INVENTION

The molding composition of the present invention employs mixtures of several resins, two or more stabilizers, four or more plasticizers, three or more lubricants and processing aids rather than larger amounts of any one. The use of a variety of ingredients enhances the efficiency of each of the ingredients and has a synergistic effect with respect to melt viscosity, melt stability and moldability in the presence of large amounts of conductive filler. Also, by using several ingredients within each category in small amounts, the chances that a particular additive will bleed out on storage or on molding, thereby staining or adversely affecting the surface quality of the disc replicas, is minimized.

Conductive particles suitable for use in the invention include highly electrically conductive, finely divided carbon blacks, preferably which have a low bulk density to reduce loading requirements. Presently preferred is a product, Ketjenblack EC, of the Armak Company which has an apparent bulk density of 150 grams per liter and an average particle size of about 300 angstroms. These carbon black particles have a high surface area and a high proportion of voids within the particles, as measured by dibutyl phthalate absorption, which enables current to flow between the conductive particles in a non-conductive polymer matrix in a highly efficient manner.

The resin system useful herein contains about 10 percent by weight of a vinyl chloride copolymer containing about 15 percent by weight of vinyl acetate. This resin is commercially available as VYHH from Union Carbide Corporation and is a solution polymerized polymer. The composition also contains about 10 percent by weight of a copolymer of vinyl chloride containing about 25 percent by weight of a maleate ester, commercially available as FPC-471 from the Firestone Company. A third polymeric ingredient is a vinyl chloride copolymer containing about 6 to 8 percent by weight of propylene, commercially available as AP-480 from Air Products and Chemicals Inc. The latter forms the bulk of the resin molding composition and its percentages will vary with the conductive particles content. Since it is the stiffest resin, the amount of this resin employed will be decreased when the conductive particle content is increased. The present combination of three vinyl chloride copolymer resins has been found to give a molding composition of increased processability and stability at elevated temperatures for the present application.

Several plasticizers are added to the basic resin system. Plasticizers are added to polyvinyl chloride resins to provide a lower melt viscosity to the mixture which reduces the internal friction of the material during molding. Because of the presence of large quantities of conductive particles herein, which stiffens the resin, fairly high amounts of plasticizers are added, from about 15–17 percent by weight of the mixture. In the preferred molding composition about 4 percent by weight of a chlorinated paraffin wax plasticizer containing about 70 percent by weight of chlorine is employed. This material is commercially available as Unichlor 70 AX from Neville Chemical Company. This material also confers fire retardant properties to the molding composition. About 3 percent by weight of glyceryl tribenzoate is added. This material is commercially available under the trade name Benzoflex S-404 from Velsicol Chemical Corporation. This compound has a melting point of 156°–162° F. (68°–72° C.) and is used in amounts of from about 1–3 percent by weight of the molding composition. Diisooctylphthalate is a low molecular weight liquid plasticizer available from Monsanto Company. This plasticizer can be added in amounts of from 5–7 percent by weight.

An epoxidized soybean oil having a molecular weight of about 1000 can be employed in amounts of from about 0.5–2 percent by weight. This material is available commercially as Paraplex G-62 from Rohm & Haas Company. This material also reacts with organotin stabilizers to further inhibit formation of volatiles and thus also functions as a stabilizer.

A processing aid which reduces the melt viscosity and elasticity of the molding composition is also added with the plasticizers. Suitably low molecular weight acrylic resins, such as an acryloid polymethyl methacrylate resin commercially available as K147 from Rohm and Haas Company can be employed. This material has an intrinsic viscosity of 0.065 to 0.075.

The large amount of plasticizers and processing aids employed herein reduces the melt viscosity and brittleness imparted by the large amount of conductive particles in the resin mixture. Again, since plasticizers are only poorly absorbed by polyvinyl chloride resins, a combination of several plasticizers, rather than larger amounts of a single plasticizer, is employed herein.

About 3½ percent by weight of a mixture of two or more metal stabilizers are employed herein. Preferably two tin salts, dibutyltin-β-mercaptopropionate, commercially available as T-35 from M&T Chemical Company, Inc. and dibutyl tin maleate, commercially available as Mark 275 from Argus Chemical Company, and a barium-cadmium-lead stearate complex, commercially available as Mark Q-232B from Argus Chemical Corp. are employed. However, other organotin salts and other stabilizers having different metals can also be substituted. A metal complex stabilizer reacts with tin stabilizers to form other metal complexes which improve stability of the molding composition at elevated temperatures. The stabilizers act primarily to neutralize any volatiles formed as decomposition products of the polyvinyl chloride resins, particularly hydrogen chloride vapor. The presence of hydrogen chloride during molding results in blisters and voids in the molding material and also etches and stains the surface of the molded article. Thus, a sufficient amount of stabilizer must be added to prevent hydrogen chloride formation. However, if too much stabilizer is added, it will not be absorbed by the resin. In general, from about 1–3 percent by weight of the total composition of any of the stabilizers can be employed, provided the total is about 3½ percent by weight.

In like manner a variety of lubricants is also added to the molding composition. If too high a percentage of any one lubricant is added, the excess amount is not absorbed by the filled resin and the resultant molding composition is non-uniform, particularly at the surface. In the case of the video disc, this could result in non-uniformity of the friction between the record and the playback stylus which leads to added noise when the disc is played. Lubricants useful herein include calcium stearate, and a room temperature solid esterified montan wax commercially available as Wax E of Hoechst Company. This material liquifies at about 76° C. A mono fatty acid ester of varying molecular weight alcohols and acids commercially available as Loxiol G-30 from Henkel International GmbH can be employed. This lubricant is solid at room temperature and has a melt viscosity at 50° C. of about 10 centipoises. A liquid, low molecular weight paraffin oil, commercially available as Oil Vasiline from Carlo ERBA, a division of Chemica Industrialle, Milan, is useful also. This oil has a viscosity at 37.8° C. of 70–85 centipoises. Using a small amount of each lubricant prevents bleed-out of any one of the lubricants during molding and provides a good release of the molded disc or other article from the mold. The addition of the calcium stearate also acts as a stabilizer.

The present molding composition can be prepared by mixing all of the solid ingredients first in a blender such as a Henschel mixer until the temperature reaches about 120° F. (49° C.) and then adding the liquid ingredients, which coat the solid particles. Mixing is discontinued when the temperature reaches about 160° F. (71° C.) and the composition is collected and charged to a Banbury mixer or other suitable apparatus such as an extruder to melt the ingredients under shear. The composition is mixed until molten, about 320° F. (160° C.), and maybe sheeted on a two roll mill and pelletized for storage. The present molding compositions are flexible, shiny, easily processed materials which have a good melt viscosity at compression molding temperatures and are very stable in the molten state, even after long periods. The molded articles prepared from them have excellent resolution of very fine details, on the order of micron dimensions, are stable and non-brittle, even when large amounts of carbon black are added.

The molded articles can be made by compression molding in conventional manner, e.g., forming a preform, compression molding using a sixty second cycle at about 325°–340° F., (163°–171° C.) depending on the conductive particle content, and removing the flashing.

For the present application, suitability of the conductive plastic material for video discs is also determined by measuring certain electrical properties during playback of the molded disc. A playback system useful herein has been described by Kawamoto et al, "Pickup Circuitry For a Video Disc Player" in copending U.S. application, Ser. No. 743,144 filed Nov. 18, 1976, now U.S. Pat. No. 4,080,625. A test signal is recorded at a carrier frequency of 5 MHz. Carrier level at 5 MHz, measured at millivolts peak to peak, is a function of the conductivity of the filled molding material and generally increases at lower resistivities. To illustrate, playback of the prior art metal coated disc having a signal track modulation of about 600 angstroms representative of a 5 MHz carrier, can provide a recovered carrier level of about 7.4 millivolts peak to peak. A similar carrier level is desirable in playback of a non-coated disc having a similar signal track modulation; although good pictures can be viewed at lower levels of about 1 millivolt.

Another property which measures the quality of the picture obtained is the carrier to noise (C/N) level ratio obtained during playback of a signal recorded at 5 megahertz, which should be as high as possible and at least about 40 decibels (dB) for commercially acceptable video. The prior art metal coated disc has a C/N level ratio of about 54 dB. This ratio generally increases as resistivity decreases.

To determine low frequency noise performance, the ratio of the noise level at 0.5 megahertz to the noise level at 5 MHz, obtained during playback of a signal recorded at 5 megahertz, is measured to indicate the slope of the noise floor. As the resistivity decreases, the slope of the noise floor decreases, i.e., the low frequency/high frequency noise level ratio is smaller in low resistivity discs. Optimally, the slope of the noise floor (0.5/5 MHz) value, should approach 3 dB.

The invention will be further illustrated by the following Examples but it is to be understood that the invention is not meant to be limited to the details disclosed therein. In the Examples, parts and percentages are by weight.

EXAMPLE 1-PART A

A molding composition was prepared by mixing the following ingredients in a Henschel mixer: 44 parts of a vinyl chloride—8 perent propylene copolymer, AP-480; 10 parts of a vinyl chloride copolymer containing 15 percent of vinyl acetate, copolymer VYHH; 10 parts of a vinyl chloride—25 percent maleate ester, FPC-471; 4 parts of 70 percent chlorinated paraffin wax, Unichlor 70AX; 3 parts of glyceryl tribenzoate, Benzoflex 404; 2 parts of epoxidized soybean oil, Paraplex G-62; 1.0 part of dibutyl tin-$\beta$-mercaptopropionate, T-35; 1.0 part of dibutyl tin maleate, Mark 275; 1.5 parts of barium-cadmium-lead stearate, Mark Q 232B; 2.0 parts of a polymethylmethacrylate processing aid K-147; 0.5 part of calcium stearate; 0.4 part of Wax E, an esterified montan wax; 0.3 part of Loxiol G-30, a mono-fatty acid ester of varying molecular weight alcohols and acids; and 15.0 parts of Ketjenblack EC carbon black. After the temperature of the mixture reached about 130° F., (54° C.) 5.0 parts of diisooctylphthalate plasticizer and 0.3 part of Oil Vaselina lubricant were added and mixing continued until the temperature reached about 180° F., (82° C.)

Twelve inch (30.5 cm) video discs were compression molded at 330° F., (165° C.) using a 60 second cycle with a metal stamper described by Clemens in U.S. Pat. No. 3,842,194 referred to hereinabove.

The molding composition had a bulk resistivity at 900 megahertz of 13 ohm-cms. The molded discs had a 5 MHz C/N ratio of 44 dB; the carrier level was 7.4 millivolts peak to peak. The slope of the noise floor was 7 dB.

EXAMPLE 1-PART B

A thin layer of a methyl alkyl siloxane lubricant having a viscosity of 50 centistokes and the formula

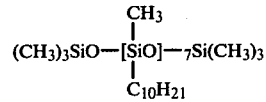

commercially available as SF-1147 of General Electric Co., was applied by spinning.

These discs had a 5 MHz C/N ratio on playback of 46 dB; the carrier level was 6.6 millivolts peak to peak and the slope of the noise floor was 7 dB.

EXAMPLE 2

A molding composition was prepared as in Example 1 except that 20 parts of carbon black were added and only 39 parts of the vinyl chloride-propylene copolymer.

This composition had a bulk resistivity of 22 ohm-cms at 900 megahertz and 20.7 ohm-cms at DC frequencies.

The 5 MHz C/N ratio on playback was 48 dB; the carrier level was 8.3 millivolts peak to peak and the slope of the noise floor was 8 dB;

Several discs were lubricated as in Example 1 Part B. These discs had a 5 MHz C/N ratio of 49 dB; the carrier level was 8.3 millivolts peak to peak and the slope of the noise floor was 7 dB.

EXAMPLE 3

Lubricated discs prepared as in Examples 1 and 2 were played while monitoring the number of incidents of poor signal in 10 minutes of play, i.e., counting the period of time during which the signal dropped below 150 millivolts output. The first play was monitored and the discs were exposed to high temperature and high humidity, i.e., 100° F., (37° C.) and 95 percent RH, for 24 hours. The discs were then played twice more while monitoring the signal. The results are summarized below:

| Sample | TOTAL TIME OF POOR SIGNAL IN SECONDS | | |
|---|---|---|---|
| | Original play | First play after conditioning | Second play after conditioning |
| Example 1 | 1.0 | 5.0 | 4.2 |
| Example 2 | 0.7 | 2.7 | 3.5 |

I claim:

1. A molding composition for molding conductive articles, said composition having a bulk resistivity below about 500 ohm-cm at 900 megahertz comprising from about 12 to about 20 percent by weight of finely divided conductive carbon black particles; about 10 percent by weight of a vinyl chloride copolymer containing about 15 percent by weight of vinyl acetate; about 10 percent by weight of a vinyl chloride copolymer containing about 25 percent by weight of maleate ester; about 15 to 17 percent by weight of a mixture of 4 or more plasticizers and processing aids; about 3.5 percent by weight of a mixture of 2 or more metal stabilizers together containing more than one metal ion; about 1.5 percent by weight of a mixture of at least three lubricants and the remainder a copolymer of vinyl chloride containing about 6–8 percent by weight of propylene, the above ingredients being uniformly dispersed in said molding composition.

2. A composition according to claim 1 wherein the metal stabilizer mixture contains one or more organotin compounds.

3. The composition according to claim 1 wherein one of the plasticizers is a chlorinated paraffin wax containing about 70 percent by weight of chlorine.

4. A composition according to claim 3 wherein another plasticizer is diisooctylphthalate.

5. A composition according to claim 3 wherein another plasticizer is glyceryl tribenzoate.

6. A composition according to claim 1 wherein the lubricants include calcium stearate.

7. A composition according to claim 1 wherein the lubricants include an esterified montan wax having a molecular weight of about 1000.

8. A composition according to claim 1 wherein the lubricants include a low molecular weight liquid paraffin oil.

9. A molding composition comprising a vinyl chloride copolymer containing about 6-8 percent by weight of propylene; about 10 percent by weight of a copolymer of vinyl chloride containing about 15 percent by weight of vinyl acetate; about 10 percent by weight of a vinyl chloride copolymer containing about 25 percent by weight of a maleate ester; about 4 percent by weight of a 70 percent by weight chlorinated paraffin wax plasticizer; about 3 percent by weight of glyceryl tribenzoate; about 1 percent by weight of dibutyltin-$\beta$-mercaptopropionate stabilizer; about 1.5 percent by weight of a barium-cadmium-lead stearate complex stabilizer; about 2 percent by weight of a polymethylmethacrylate processing aid; about 0.3 percent by weight of a monofatty acid ester of various molecular weight alcohols and fatty acids lubricant having a melt viscosity at 50° C. of about 10 centipoises; about 0.4 percent by weight of an esterified montan wax lubricant having a melting point of about 76° C.; about 0.5 percent by weight of calcium stearate; about 0.3 percent by weight of a paraffin oil having a viscosity at 37.8° C. of 70-85 centipoises; about 1 percent by weight of dibutyltin maleate stabilizer; about 0.5 to 2 percent by weight of an epoxidized soybean oil plasticizer having a molecular weight of about 1000; about 5 percent by weight of diisooctylphthalate; and 12-20 percent by weight of finely divide conductive carbon black, the above ingredients being uniformly dispersed in said molding composition.

10. In a video information record, adapted for use with a playback stylus to effect recovery of signals occupying a bandwidth of at least several megahertz when relative motion at a desired rate is established between said record and said stylus, said record comprising a disc of a plastic material containing finely divided conductive particles and having a bulk resistivity below about 500 ohms-cms at 900 megahertz, said record having a spiral groove in a surface, said groove dimensioned for reception therein of a playback stylus and containing an information track constituted by a surface relief pattern in said groove of such dimension to accommodate recovery of signals of said bandwidth upon establishment of said motion at said rate, the improvement comprising employing as said plastic material a molding composition comprising from about 12-20 percent by weight of finely divided conductive carbon black particles; about 10 percent by weight of a vinyl chloride copolymer containing about 15 percent by weight of vinyl acetate; about 10 percent by weight of a vinyl chloride copolymer containing 25 percent by weight of a maleate ester; about 15-17 percent by weight of a mixture of 4 or more plasticizers and processing aids; about 3.5 percent by weight of a mixture of 2 or more metal stabilizers together containing more than one metal ion; about 1.5 percent by weight of a mixture of at least 3 lubricants and the remainder a copolymer of vinyl chloride containing about 6-8 percent by weight of propylene, the above ingredients being uniformly dispersed in said molding composition.

* * * * *